United States Patent [19]

Melton

[11] Patent Number: 4,578,892
[45] Date of Patent: Apr. 1, 1986

[54] RODENT TRAP

[75] Inventor: Melvin M. Melton, San Clemente, Calif.

[73] Assignee: Oscar Obst, Jr., San Clemente, Calif.

[21] Appl. No.: 718,553

[22] Filed: Apr. 1, 1985

[51] Int. Cl.[4] ................ A01M 23/18; A01M 23/06
[52] U.S. Cl. ........................................ 43/60; 43/58; 43/61
[58] Field of Search ............... 43/60, 61, 67, 58

[56] References Cited

U.S. PATENT DOCUMENTS

| 724,931 | 4/1903 | Phillips | 43/61 |
|---|---|---|---|
| 1,240,248 | 9/1917 | Pease et al. | 43/60 |
| 1,273,185 | 7/1918 | Reich | 43/61 |
| 1,581,297 | 4/1926 | Schmuck | 43/61 |
| 2,475,462 | 7/1949 | Rosen | 43/61 |
| 2,485,319 | 10/1949 | Rosen | 43/61 |
| 4,144,667 | 3/1979 | Souza | 43/61 |
| 4,232,472 | 11/1980 | Muelling | 43/61 |
| 4,379,374 | 4/1983 | Lindley | 43/61 |
| 4,393,616 | 7/1983 | Kaufman et al. | 43/60 |

FOREIGN PATENT DOCUMENTS 476426  2/1928  Fed. Rep. of Germany ......... 43/67

Primary Examiner—Nicholas P. Godici
Assistant Examiner—M. Jordan
Attorney, Agent, or Firm—Leonard Tachner

[57] ABSTRACT

An animal trap especially suited for trapping rodents such as mice and other small animals, comprising a disposable, elongated container having two contiguous bottom surfaces forming an obtuse angle therebetween and a hinged door for selectively enclosing the container after the animal has entered and sprung the trap. When set, the trap rests on a first of the two bottom surfaces with the door held elevated from the container to permit an animal to enter the trap. The second of the two bottom surfaces is elevated from the underlying support surface. When the animal enters the portion of the container where the bait is positioned, the animal's weight lowers the second bottom surface and elevates the first bottom surface releasing the door and closing the container trapping the animal. The door is sealed by magnetic force and/or a latch which hooks into an aperture in the first bottom surface. The trap is especially configured as an integral unit for low cost manufacture by means of molding or extruding various plastics.

14 Claims, 8 Drawing Figures

RODENT TRAP

BACKGROUND OF THE INVENTION

1. Field of the Invention

The present invention relates generally to animal traps and more specifically, to traps particularly suitable for catching mice and other small rodents in a disposable container which may be readily discarded after its use and without requiring exposure of the trapped rodent.

b 2. Prior Art

The art of animal traps is old and many different trap configurations have been designed in an attempt to provide a reliable and inexpensive device for capturing and disposing of small animals such as mice and other rodents. The most common mousetrap of current use is the well-known bait spring device which has achieved commercial success primarily because it is of simple design and relatively low cost. Unfortunately, the bait loaded spring-type mousetrap is disadvantageous in a number of respects. One such disadvantage is the possibility of injury to the user in setting the trap if a spring loaded bar designed to kill the rodent is inadvertently released while fingers or other human body parts are in the way. The risk of injury is especially high to young children or household pets whose curiosity gets the better of them. Another significant disadvantage to the conventional low-cost mousetrap is the distastefulness of having to observe or even clean up the blood or other parts of the rodent that has been caught and killed by the trap.

Thus, there has been a long-felt need for a simple and low cost rodent trap that is at least as inexpensive as the aforementioned conventional spring loaded trap but which does not present the noted disadvantages of such spring loaded traps. A number of attempts have been made to provide a trap which satisfies these criteria, but typically either the cost or complexity or both and the reliability of such traps have been less than desirable and the aforementioned long-felt need has remained unsatisfied. By way of example, the following U.S. patents disclose animal traps which are relevant to varying degrees to the present invention:

No. 1,240,248: Pease, et al
No. 1,273,185: Reich
No. 1,581,297: Schmuck

The patent to Pease et al discloses an animal trap including a tube that is tapered so that the greater weight of the body lies near the open end which may be closed by a gate which is adapted for vertical motion within a pair of vertical sills. When the animal runs into the trap, the animals weight unbalances the trap towards the rear causing the gate to close trapping the animal inside. A similar concept is disclosed in the Reich patent in which an animal trap in the form of a mailbox-shaped tube is again adapted to rotate about a foot which is integral and at right angles to a door. When the weight of the animal forces the tube to rotate rearwardly about the foot, the foot collapses forward thereby closing the door. A forwardly positioned plate assures that the initial weight of the trap is such that the trap will be inclined towards the forward portion thereof until the animal enters the trap. Still another disclosure of a device that uses a similar concept is shown in the patent to Schmuck in which a rectangular tube is again balanced on a V-shaped fulcrum support. The open end of the tube is initially inclined downwardly and includes a door or closure which is designed to lower automatically within a pair of parallel slots when the weight of the animal forces the rearward portion of the tube to be lowered and the forward open portion of the tube to be raised.

It can be seen that all of the aforementioned prior art patents disclose animal traps which attempt to overcome the aforementioned deficiencies of the spring loaded conventional trap. More specifically, each discloses a device which obviates the aforementioned risk of injury to the user while setting the trap and each discloses a device which is designed to contain the trapped animal thereby removing the requirement for observing and/or cleaning up the mess created by the spring loaded device. Unfortunately, in overcoming these disadvantages, the patented devices result in additional disadvantages which render them commercially undesirable for providing substitutes for the inexpensive conventional trap described above. For example, in each instance of the aforementioned prior art patents, the door closing mechanism is far too complex and unreliable thereby reducing the probability of trapping the animal. Furthermore, each such device is of a generally complex configuration which is not conducive to low cost manufacturing techniques and which therefore cannot be produced at a cost which would permit them to be competitive in the marketplace as compared to the aforementioned conventional spring loaded devices.

SUMMARY OF THE INVENTION

The present invention overcomes the aforementioned disadvantages of the prior art by providing a trap of a uniform integral container configuration which is specifically designed to be manufactured by low cost techniques such as plastic molding and like, which is reliable in its operations and free of any risk of injury to the user. Furthermore, the present invention uses an integral type door which is of simple and reliable configuration and which is configured to merely swing shut to trap the animal that has entered the invention. The aforementioned integral swinging door and the novel shape of the container are the principal unique features of the present invention. More specifically, unlike the relatively complex configurations of the aforementioned prior art, the container of the present invention is formed of two integrated substantially rectangular, cylindrical compartments angled with respect to one another whereby the weight of the rodent entering the rear-most portion of the container activates closure of the door thereby trapping the rodent within the container. However, unlike the prior art devices previously described, the container of the present invention comprises a unitary smooth surface device without pivots or feet or other affixed or odd shaped structures which would otherwise add to the complexity and cost of the device.

OBJECTS OF THE INVENTION

It is therefore a principal object of the present invention to provide a rodent trap which substantially reduces or entirely overcomes the noted disadvantages of conventional traps and which is still of low cost configuration and therefore commercially more attractive than conventional devices.

It is an additional object of the present invention to provide a rodent trap which is of substantially uniform integral configuration particularly suitable for low cost plastic molding manufacture or manufactured by other comparable low cost techniques.

It is still an additional object of the present invention to provide a rodent trap which is reliable in operation, free of risk of injury to the user, and which is configured to be produced at sufficiently low cost to make it commercially competitive with conventional spring loaded traps.

BRIEF DESCRIPTION OF THE DRAWINGS

The aforementioned objects and advantages of the present invention as well as additional objects and advantages thereof, will be more fully understood hereinafter as a result of a detailed description of preferred embodiments of the invention taken in conjunction with the following drawings in which.

DESCRIPTION OF PREFERRED EMBODIMENTS

Figure 1:
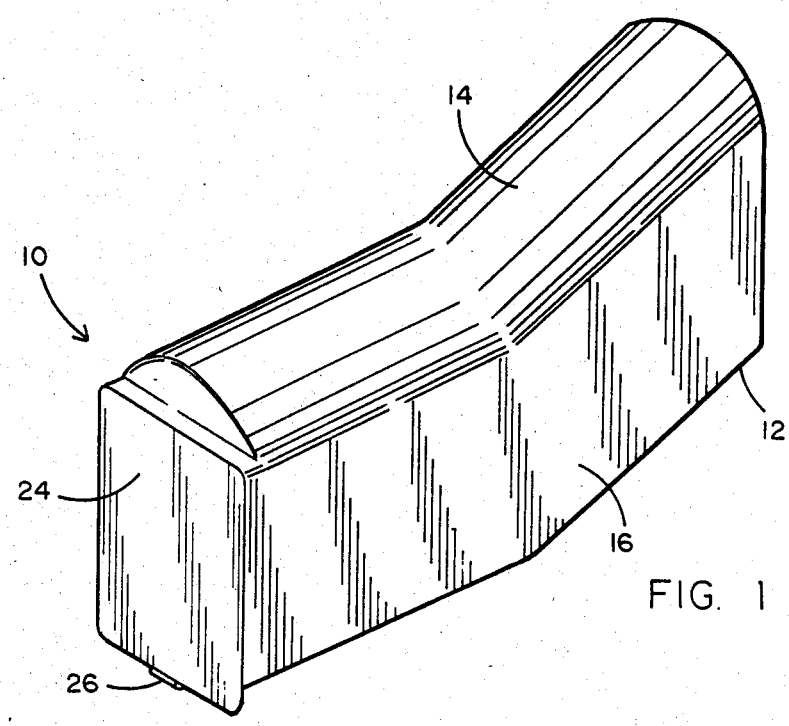
FIG. 1 is a three-dimensional view of a first embodiment of the invention.
Figure 2:
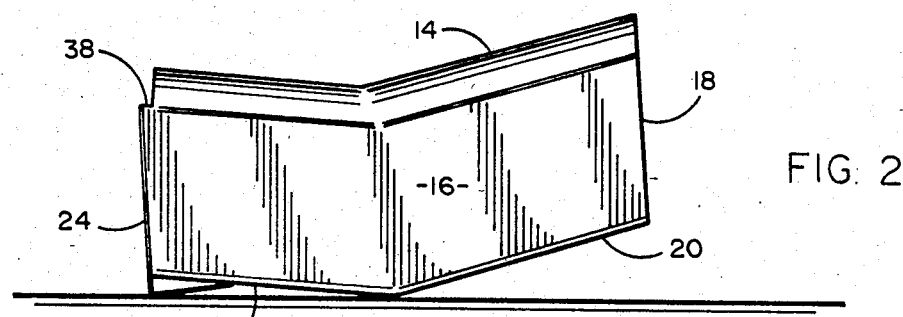
FIG. 2 is a side view of the invention.

Referring first to FIGS. 1-4 it will be seen that the rodent trap 10 of the present invention comprises a container 12 enclosed on all sides by a roof 14, a pair of elongated sides 16, a rear wall 18, bottom surfaces 20 and 22 and a door 24 which selectively closes an opening 25 into the container. Container 12 is preferably made of a smooth lightweight plastic of about 1/16 of an inch in thickness and preferably at least partially translucent. The bottom surfaces 20 and 22 form an obtuse angle relative to one another of about 160 degrees, although, as will be seen hereinafter, the operation of the present invention may be quite suitable when the angle between the surfaces 20 and 22 is even somewhat greater and certainly when it is less than 160 degrees. The range of preferable angles is 140 degrees to 170 degrees. The top of the container or roof 14 is preferably configured to be other than flat such as the partially circular or curved roof line 14 of FIG. 1 of a first embodiment of the invention or in the alternative, of a triangular roof line configuration 44 of an alternative embodiment of the invention to be discussed hereinafter in conjunction with FIG. 5. Although the roof line in the embodiments herein illustrated is generally parallel to the corresponding bottom surface 20 and 22 along the length of container 12, it will be seen that the roof line could be readily configured to have a uniform profile defining a straight line between the rear wall 18 and the area immediately adjacent door 24.

As seen best in FIG. 1 door 24 is of a substantially rectangular configuration designed to entirely enclose the opening 25 of container 12 when the door is in its closed configuration. Door 24 is preferably attached by means of a hinge to the container 12 adjacent a flat 38 which is formed between termination of the roof 14 and the hinge 36. For purposes of minimizing the manufacturing costs, door 24 would preferably be made of the same material as the remaining portions of container 12 and, preferably, be formed in the same molding or extruding process wherein the hinge is provided in the form of a stressed line or depression at the intersection of door 24 and a flat 38 whereby to permit door 24 to swing between its open and closed position relative to container 12 while being integral thereto. Door 24 extends from hinge 36 toward the bottom surface 22. It is preferably of sufficient length to extend slightly beyond the surface 22 as seen best in FIG. 2.

Figure 3:
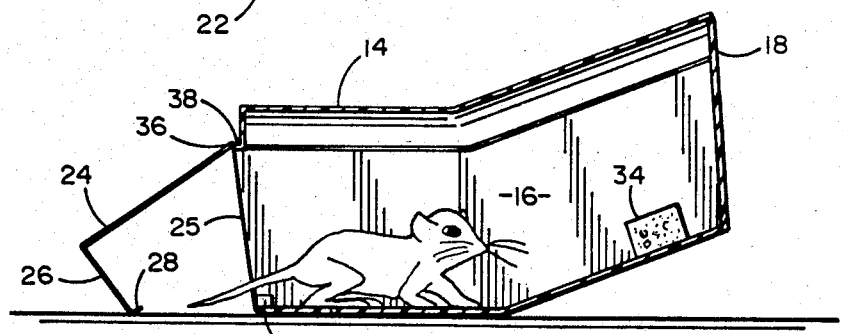
FIG. 3 is a cross-sectional side view of the invention shown in its configuration set for trapping a rodent.
Figure 4:
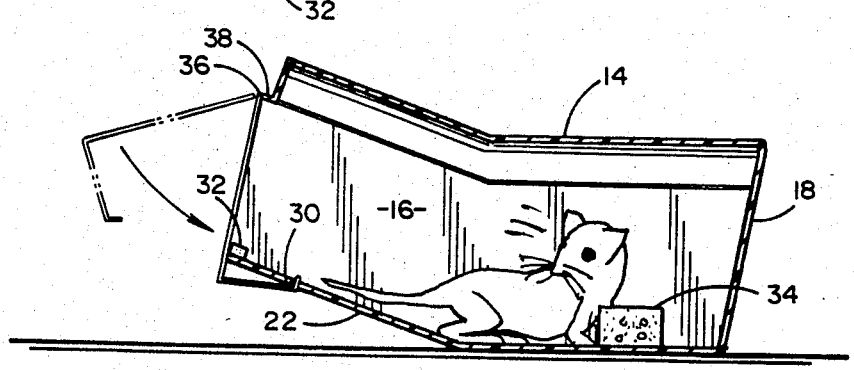
FIG. 4 is a cross-sectional side view of the invention illustrating the manner in which the invention operates.
Figure 8:
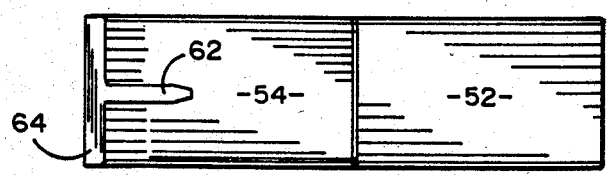
FIG. 8 is a bottom view of the invention illustrating the manner in which the preferred door configuration operates.

In one embodiment, the door 24 is provided with a latch 26 which terminates in a perpendicularly configured hook 28 as seen best in FIGS. 3 and 4. As seen best in FIGS. 4 and 8, the bottom surface 22 of container 12 is provided with an aperture 30 suitably positioned in the bottom surface to receive the hook 28 when the door is fully closed. Hook 28 and aperture 30 act together to provide a means for securing the door in its closed position after the trap has been actuated by a rodent entering the trap. An alternative or additional form of securing door 24 in its closed configuration may be provided in the form of a magnet 32 suitably affixed adjacent the opening 25 on the inside of the container 12 such as by being glued to the interior side of surface 22. Furthermore, the door 24 would be provided either in the form of a magnetically reactive material or coated with a layer of suitable metal or otherwise have a layer of suitable metal affixed to the inside surface thereof for adherence to the magnet 32 when door 24 is in its fully closed position.

As also seen best in FIGS. 3 and 4, trap 10 of the present invention is preferably provided with a suitable form of bait 34 in the form of either a piece of cheese or bacon or other similar food substance or chemical subsitute particularly attractive to rodents and which preferably provides an odor which can be readily detected by rodents in the general area of the trap.

Operation of trap 10 of the present invention may be understood by reference to FIGS. 3 and 4. More specifically, the trap 10 is set by placing it in the configuration as shown in FIG. 3 wherein the container 12 is positioned to allow it to rest on bottom surface 22 wherein the opening 25 is immediately adjacent the underlying support and the rear wall 18 is relatively elevated. In this position, the center of gravity is above bottom surface 22. Furthermore, the door 24 is placed in its opened configuration by swinging it outward from the opening 25 about hinges 36 so that door 24 may in effect rest against the underlying surface against which the latch 26 bears for supporting door 24 in its open configuration swung outwardly from the opening 25. In this configuration the door emanating from the bait 34 can only exit the trap 10 through opening 25 because of the otherwise substantially airtight integral relationship between the various surfaces of container 12. The odor attracts any nearby rodents to the container which may be carefully examined by the rodent before it decides to enter the trap. For this reason as previously indicated, it may be preferable that the material of which container 12 is manufactured is at least partially translucent particularly in the area adjacent the rear wall 18 so that the rodent may observe the location of the bait 34 contained within the trap 10 before it enters. The door 24 is swung away from the opening 25 whereby to permit virtually any rodent suitable for trapping within the container 12 to enter the opening 25 at first placing his weight on the bottom surface 22 from which location the rodent may more readily observe, smell and be attracted to the bait 34.

Upon further entry into the container 12 and movement closer to the bait 34 to which the attention of the rodent has been directed, the weight of the rodent is transferred from bottom surface 22 to bottom surface 20. As a result, the weight of the rodent places a sufficient force against the bottom surface 20 of container 12 to rotate the container clockwise as seen in FIGS. 3 and 4 whereby to bring the bottom surface 20 in contact with the underlying support structure and at the same time elevate the bottom surface 22 along with the opening 25, the hinge 36 and the door 24. The rodent therefore shifts the center of gravity of the combination to a point above surface 20. Clearly, elevation of door 24 releases the latch 26 previously supported by the underlying structure and allows the door 24 to swing into its closed position as it will do in response to the force of gravity as a result of the inherent weight of the door or of the combined weight of the door and an affixed metal layer or magnet. The force or momentum of the door swinging towards the opening 25, brings the door into engagement with the end portions of the sidewalls 16 and bottom surface 20 defining the opening 25 whereby to allow contact between the magnet 32 and the metal surface of door 24 and secure the door in its closed position.

Furthermore, in the particular embodiment illustrated in FIGS. 3 and 4, hook 28 of latch 26 will mate with and enter the aperture 30 whereby to further secure the door in its closed position. More specifically, if the rodent attempts to exit the container 12 it must do so by approaching the door 24 which will again place its weight above bottom surface 22 which again elevate rear wall 18 and brings bottom surface 22 in contact with the underlying support structure. This activity places the trap 10 in the configuration illustrated in FIG. 2 relative to the underlying support structure wherein the weight of the trapped rodent assures that the relative positions of hook 28 and aperture 30 are maintained to secure closure of door 24 and render it impossible for the rodent to escape.

The closed door configuration of the trap 10 alerts the user of the fact that the trap has been sprung and that a rodent is most likely contained therein. The user may of course open the door 24 and dispose of the rodent by allowing it to fall out of the trap 10. However, the present invention is, by means of its unique structure, configured to be manufactured at extremely low cost and therefore, may be preferably disposed of merely by discarding the entire trap including the rodent contained therein. The rodent of course will asphyxiate within the airtight trap within a matter of minutes after door 24 has closed.

Figure 5:
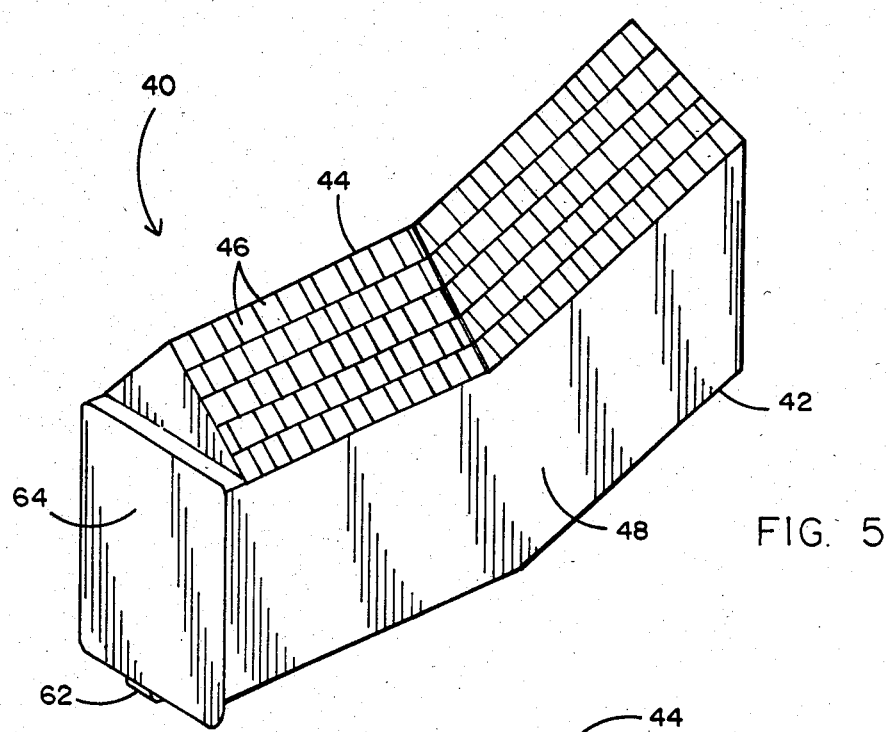
FIG. 5 is a three-dimensional view of the second embodiment of the invention.

An alternative embodiment of the present invention is illustrated in FIG. 5. The rodent trap 40 of FIG. 5 comprises a container 42 enclosed by an integral roof 44, a pair of elongated sides 48, a rear wall 50 and bottom surfaces 52 and 54, a opening 55 is secured by door 64 or alternatively, by an even more simply configured door 56 which is of planar configuration with no latch. The embodiment of the invention illustrated in FIG. 5 is otherwise substantially equivalent to that illustrated in FIGS. 1-4 with the exception of the roof configuration. More specifically, as seen in FIG. 5, the roof 44 of the present invention may be configured in the form of a triangular cross-section and be molded to exhibit a simulated shingle appearance to enhance the ornamental configuration of the trap and therefore, improve its marketability. Like the circular or curved configuration of roof 14 of the trap 10 of FIG. 1, the shingle roof configuration of the trap 40 of FIG. 5 may be provided with a termination plane short of the opening 55 to provide convenient interconnection for a hinge 58 of the same type previously described as the first embodiment illustrated. Door 64 is again of substantially rectangular configuration and is provided with a latch 62 which operates in an identical manner to that of latch 26 described previously in conjunction with FIGS. 1-4. The relative configuration of latch 62 and therefore of identical latch 26 is illustrated best in FIG. 8.

Figure 6:
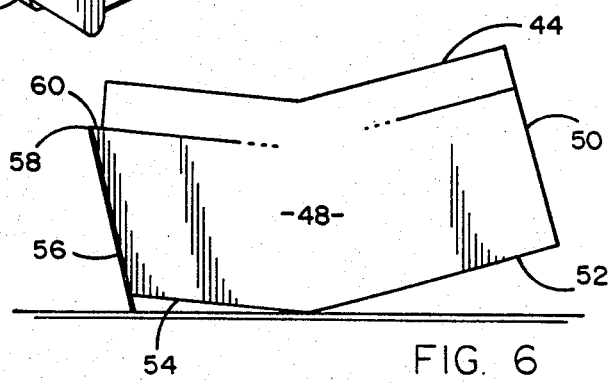
FIG. 6 is a side view of a second embodiment of the invention utilizing an alternative door structure.
Figure 7:
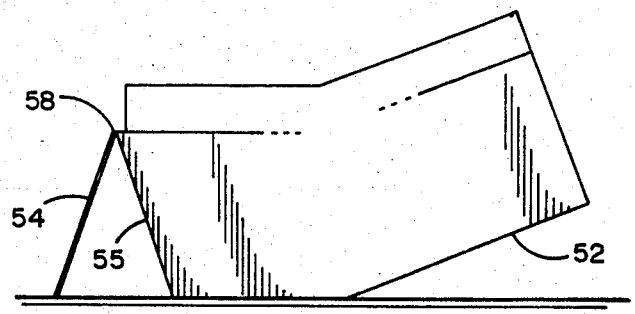
FIG. 7 is a side view of the second embodiment of the invention showing the manner in which the alternative door structure may be utilized.

An alternative door configuration which can be used with the present invention is illustrated in FIGS. 6 and 7 wherein it is shown that a door 56 extends beyond the underlying bottom surface 54 which together with flat 60 and elongated sides 48 define the opening 55. Latchless door 56 may still be supported by the underlying surface when the trap is set as shown in FIG. 7 wherein the door 64 is of sufficient length to engage the underlying surface while still providing suitable access to opening 55 to provide entry to the trap 40 to the rodent.

It will be understood that operation of the second embodiment of the trap 40, whether with the door 64 including latch 62 or the door 56 which does not employ a latch, is the same as that previously described for the first embodiment of the trap 10. More specifically, the trap is set by opening door 64 and placing the trap in a configuration whereby bottom surface 54 is in contact with the underlying surface and whereby the bottom surface 52 and rear wall 50 are elevated. When the rodent's weight is applied to the interior of the container above bottom surface 52 the trap 40 rotates clockwise thereby allowing door to swing freely into its closed position sealing the opening 55 and trapping the rodent.

Those having skill in the art to which the present invention pertains will now understand that what has been described herein comprises a novel rodent trap which by its very simplicity encompasses the advantages of the prior art while overcoming its disadvantages. More specifically, the present invention provides a reliable and safe rodent trap which is of sufficiently low cost configuration to be commercially competitive or even more attractive than conventional spring loaded rodent traps while providing a containerized trap which may be readily discarded, rodent and all.

As a result of applicant's teaching herein, a number of modifications and additions may now be perceived. By way of example, various other container and roof geometries would no doubt also provide satisfactory operation and provide all the noted advantages while avoiding the noted disadvantages of the prior art. Accordingly, all such modifications and additions are deemed to be within the scope of the present invention which is to be limited only by the claims appended hereto.

I claim:

1. A rodent trap comprising:
a container having an opening for permitting entry by a rodent, said container having a bottom comprising at least two bottom surfaces rigidly connected and oriented at an obtuse angle relative to one another whereby said opening is elevated when said container rests on a first of said bottom surfaces and said opening is not elevated when said container rests on the second of said bottom surfaces, and a hinged door, said door being adapted to close said opening when said opening is elevated and to remain elevated from said opening when said opening is not elevated.

2. The rodent trap recited in claim 1 wherein the center of gravity of said trap is above said second bottom surface.

3. The rodent trap recited in claim 2 wherein said center of gravity shifts to a point above said first bottom surface when a rodent is positioned substantially on said first bottom surface inside said container.

4. The rodent trap recited in claim 1 wherein said door is hinged at the top of said opening and is of sufficient length to remain ajar and elevated from said opening when said opening is not elevated.

5. The rodent trap recited in claim 1 further comprising a magnet affixed within said container adjacent said opening, and a magnetic material located on said door for engagement with said magnet when said door closes said opening.

6. The rodent trap recited in claim 1 further comprising a latch on said door and means on said container for receiving said latch for locking said door when said door closes said opening.

7. The rodent trap recited in claim 1 wherein said latch comprises a hook and wherein said means for receiving comprises a hole in said second bottom surface, said hole being positioned for receiving said hook.

8. The rodent trap recited in claim 1 wherein said obtuse angle is substantially in the range of about 140 degrees to about 170 degrees.

9. The rodent trap recited in claim 1 wherein said obtuse angle is about 160 degrees.

10. The rodent trap recited in claim 1 wherein said two bottom surfaces are contiguous to each other.

11. The rodent trap recited in claim 1 wherein said opening is the sole entrance into said container for a rodent.

12. The rodent trap recited in claim 1 wherein said container and said door are integral portions of a unitary structure.

13. The rodent trap recited in claim 1 further comprising means for attracting a rodent into said container and onto said first bottom surface.

14. The rodent trap recited in claim 1 wherein said container comprises a top surface of triangular cross-section adapted to simulate the appearance of a shingled roof.

* * * * *

UNITED STATES PATENT AND TRADEMARK OFFICE
CERTIFICATE OF CORRECTION

PATENT NO. : 4,578,892
DATED : April 1, 1986
INVENTOR(S) : Melvin M. Melton

It is certified that error appears in the above—identified patent and that said Letters Patent is hereby corrected as shown below:

Column 4, line 56, change "door" to --odor--.

Title Page, under Assignee, after the assignee's name please add -- part interest --.

Signed and Sealed this

Twenty-third Day of December, 1986

Attest:

DONALD J. QUIGG

*Attesting Officer*  *Commissioner of Patents and Trademarks*